(12) United States Patent
Hiraku et al.

(10) Patent No.: US 7,464,693 B2
(45) Date of Patent: Dec. 16, 2008

(54) INTERNAL COMBUSTION ENGINE INCLUDING PLURAL CYLINDERS, CONTROL APPARATUS AND CONTROL METHOD FOR INTERNAL COMBUSTION ENGINE INCLUDING PLURAL CYLINDERS

(75) Inventors: Keizo Hiraku, Nishikamo-gun (JP); Akira Hashizume, Yokohama (JP); Takashi Tsunooka, Susono (JP); Hirohiko Yamada, Okazaki (JP); Masakazu Yamada, Nagoya (JP)

(73) Assignees: Toyota Jidosha Kabushiki Kaisha, Toyota (JP); Denso Corporation, Kariya (JP)

( * ) Notice: Subject to any disclaimer, the term of this patent is extended or adjusted under 35 U.S.C. 154(b) by 430 days.

(21) Appl. No.: 10/867,685

(22) Filed: Jun. 16, 2004

(65) Prior Publication Data

US 2004/0261400 A1 Dec. 30, 2004

(30) Foreign Application Priority Data

Jun. 24, 2003 (JP) ............................. 2003-178848

(51) Int. Cl.
*F02D 31/00* (2006.01)
*F02M 7/00* (2006.01)

(52) U.S. Cl. .................................... 123/357; 123/90.15

(58) Field of Classification Search ................. 123/357, 123/419, 436, 358, 359, 198 D, 90.15, 478, 123/687, 692, 295, 305; 73/117.3, 119 A, 73/114.31, 114.42
See application file for complete search history.

(56) References Cited

U.S. PATENT DOCUMENTS 4,357,662 A * 11/1982 Schira et al. ................ 701/111
4,766,863 A * 8/1988 Fujimori ................. 123/339.21
5,263,453 A * 11/1993 Wakahara et al. ........... 123/436
5,709,192 A * 1/1998 Zimmermann .............. 123/436
5,740,780 A 4/1998 Shimizu et al.
6,330,510 B1 * 12/2001 Takaku et al. ................ 701/114
6,425,357 B2 7/2002 Shimizu et al.

(Continued)

FOREIGN PATENT DOCUMENTS

EP A2-0456392 11/1991

(Continued)

*Primary Examiner*—Mahmoud Gimie
(74) *Attorney, Agent, or Firm*—Oliff & Berridge, PLC

(57) ABSTRACT

A combustion condition for each of plural cylinders included in an internal combustion engine is set by the following control that is performed according to an intake air amount in each of the plural cylinders. A reference cylinder is set to a cylinder in which the intake air amount is smallest, and a fuel injection amount for the reference cylinder is set to a fuel injection amount for realizing a stoichiometric air-fuel ratio. The air-fuel ratio in each of the cylinders other than the reference cylinder is set according to the intake air amount in each of the cylinders such that the torque equal to reference torque generated in the reference cylinder is generated. When this setting is performed, air-fuel ratios that are out of a predetermined region in the vicinity of the stoichiometric air-fuel ratio (i.e., air-fuel ratios that are in an avoidance region) are excluded. With respect to a cylinder in which the torque equal to the reference torque cannot be generated only by setting the air-fuel ratio, correction of the ignition timing is further performed so as to suppress a difference between the torque generated in the cylinder and the reference torque.

12 Claims, 9 Drawing Sheets

U.S. PATENT DOCUMENTS 6,497,212 B2 * 12/2002 Matsumoto et al. ......... 123/295
6,668,791 B2 * 12/2003 Tetsuno et al. .............. 123/295

FOREIGN PATENT DOCUMENTS

| EP | 0 860 595 A1 | 8/1998 |
|---|---|---|
| EP | A-1217191 | 6/2002 |
| EP | A2-1229230 | 8/2002 |
| GB | A-2 183 062 | 5/1987 |
| JP | U 63-202751 | 12/1988 |
| JP | U-03-102038 | 4/1991 |
| JP | A-09-032710 | 2/1997 |
| JP | A-10-231751 | 9/1998 |
| JP | A 11-62639 | 3/1999 |
| JP | A-2000-204934 | 7/2000 |
| JP | A-2002-155779 | 5/2002 |
| JP | A-2002-303187 | 10/2002 |
| JP | A-2002-364394 | 12/2002 |

* cited by examiner

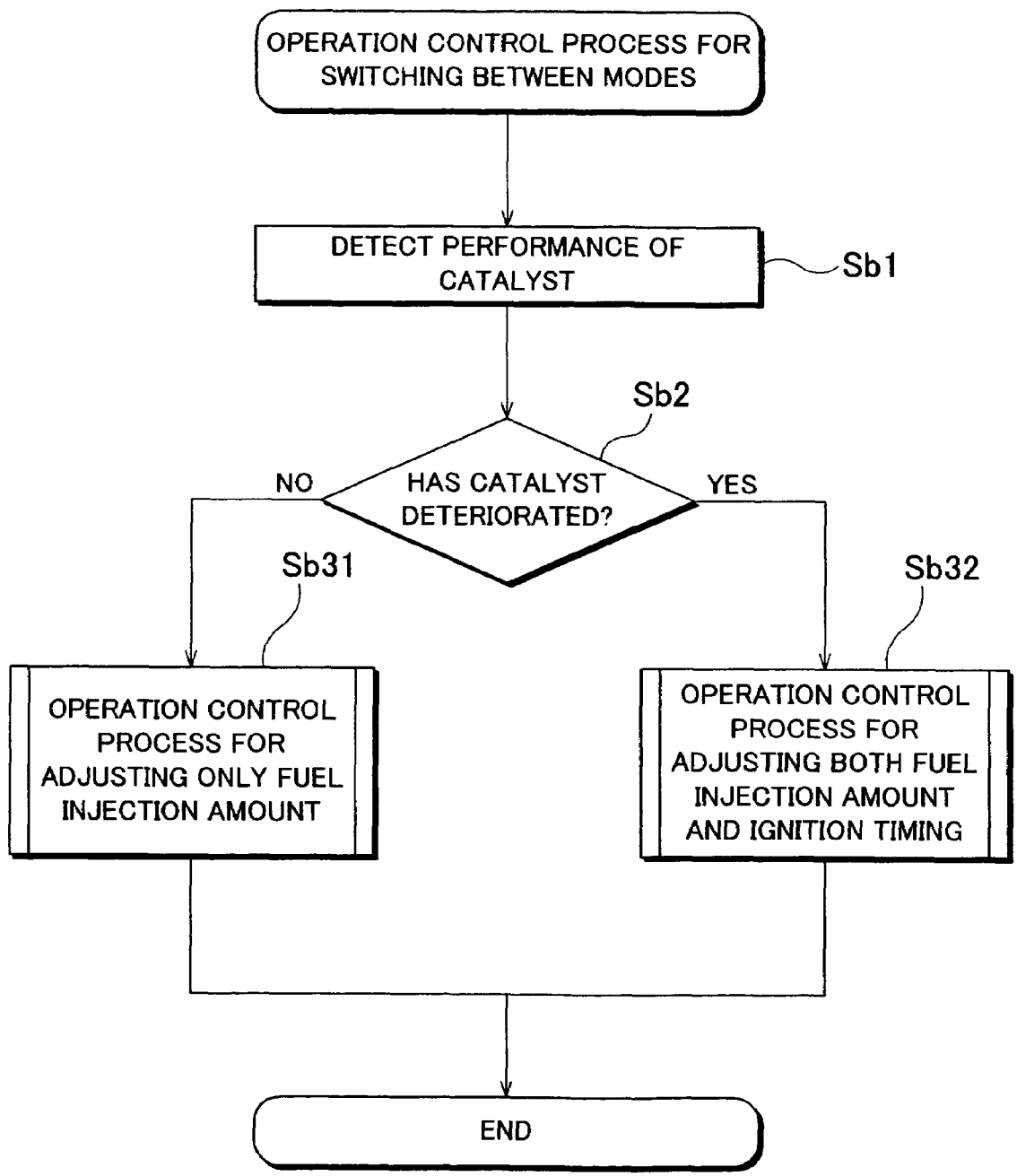

INTERNAL COMBUSTION ENGINE INCLUDING PLURAL CYLINDERS, CONTROL APPARATUS AND CONTROL METHOD FOR INTERNAL COMBUSTION ENGINE INCLUDING PLURAL CYLINDERS

INCORPORATION BY REFERENCE

The disclosure of Japanese Patent Application No. 2003-178848 filed on Jun. 24, 2003, including the specification, drawings and abstract is incorporated herein by reference in its entirety.

BACKGROUND OF THE INVENTION

1. Field of the Invention

The invention relates to an internal combustion engine including plural cylinders, a control apparatus and a control method for an internal combustion engine including plural cylinders.

2. Description of the Related Art

A gasoline engine is proposed, which includes a variable valve system in which valve opening characteristics such as opening/closing timing and an opening/closing amount of a valve are varied. In the gasoline engine including the variable valve system, an intake air amount of each cylinder can be controlled by changing valve opening characteristics of an intake valve (refer to Japanese Patent Laid-Open Publication No. JP-A-2001-263015).

In the gasoline engine including the variable valve system, there may be irregular differences in valve opening characteristics of an intake valve among cylinders. Such differences in valve opening characteristics among cylinders cause a problem concerning the operating state of the internal combustion engine. For example, when a working angle or a lift amount is small, the differences in valve opening characteristics cause differences in the intake air amount among the cylinders. The differences in the intake air amount cause differences in the air-fuel ratio, which results in a problem such as an increase in an emission amount.

Thus, in order to obtain a desired combustion state even when there are differences in the intake air amount among the cylinders, a technology is proposed, in which a fuel injection amount for each cylinder is decided according to the intake air amount in each cylinder. As an example of such a technology, Japanese Patent Laid-Open Publication No. JP-A-11-62639 discloses a technology in which a fuel injection amount for achieving a stoichiometric air-fuel ratio (hereinafter, referred to as "basic injection amount") is decided for each cylinder.

However, when the fuel injection amounts in all of the cylinders are controlled such that the air-fuel ratios in all of the cylinders become equal, the torque generated in each cylinder (hereinafter, referred to as "generated torque") is different due to the fact that the intake air amount varies with each cylinder. The differences in the generated torque cause engine speed fluctuation or torque fluctuation.

SUMMARY OF THE INVENTION

It is an object of the invention to provide a technology which can suppress both a variance in the air-fuel ratios of plural cylinders, and a fluctuation in torque.

A first aspect of the invention relates to a control apparatus which controls operation of an internal combustion engine including plural cylinders. The control apparatus includes an obtaining portion that obtains a parameter concerning a valve opening characteristic of an intake valve of each of the plural cylinders; a combustion condition deciding portion that decides a combustion condition for each of the plural cylinders determined by at least one of a fuel injection amount and ignition timing, according to the parameter; and a control portion that controls operation of each of the plural cylinders under the decided combustion condition. Also, torque generated in each of the plural cylinders is decided according to the parameter and the combustion condition, and the combustion condition deciding portion decides the combustion condition such that a difference between the torque generated in each of the plural cylinders and reference torque is in a predetermined permissible range.

With this arrangement, when deciding the combustion condition for each of the cylinders, torque fluctuation can be suppressed. Further, in the aforementioned control, the combustion condition may be set such that air-fuel ratios in the plural cylinders are in a predetermined region. Thus, it is possible to suppress both a variance in the air-fuel ratios of the plural cylinders, and a fluctuation in torque.

A second aspect of the invention relates to an internal combustion engine including plural cylinders, the aforementioned control apparatus, and a variable valve system in which the aforementioned valve opening characteristics are varied.

The invention can be configured in various aspects such as an operation method or a control method for an internal combustion engine (including an operating method of an internal combustion engine), in addition to aspects as a control apparatus for an internal combustion engine and an internal combustion engine.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIG. 9 is a flowchart showing an operating control process for switching among modes of deciding a target injection amount and target ignition timing.

DETAILED DESCRIPTION OF THE PREFERRED EMBODIMENTS

Figure 1:
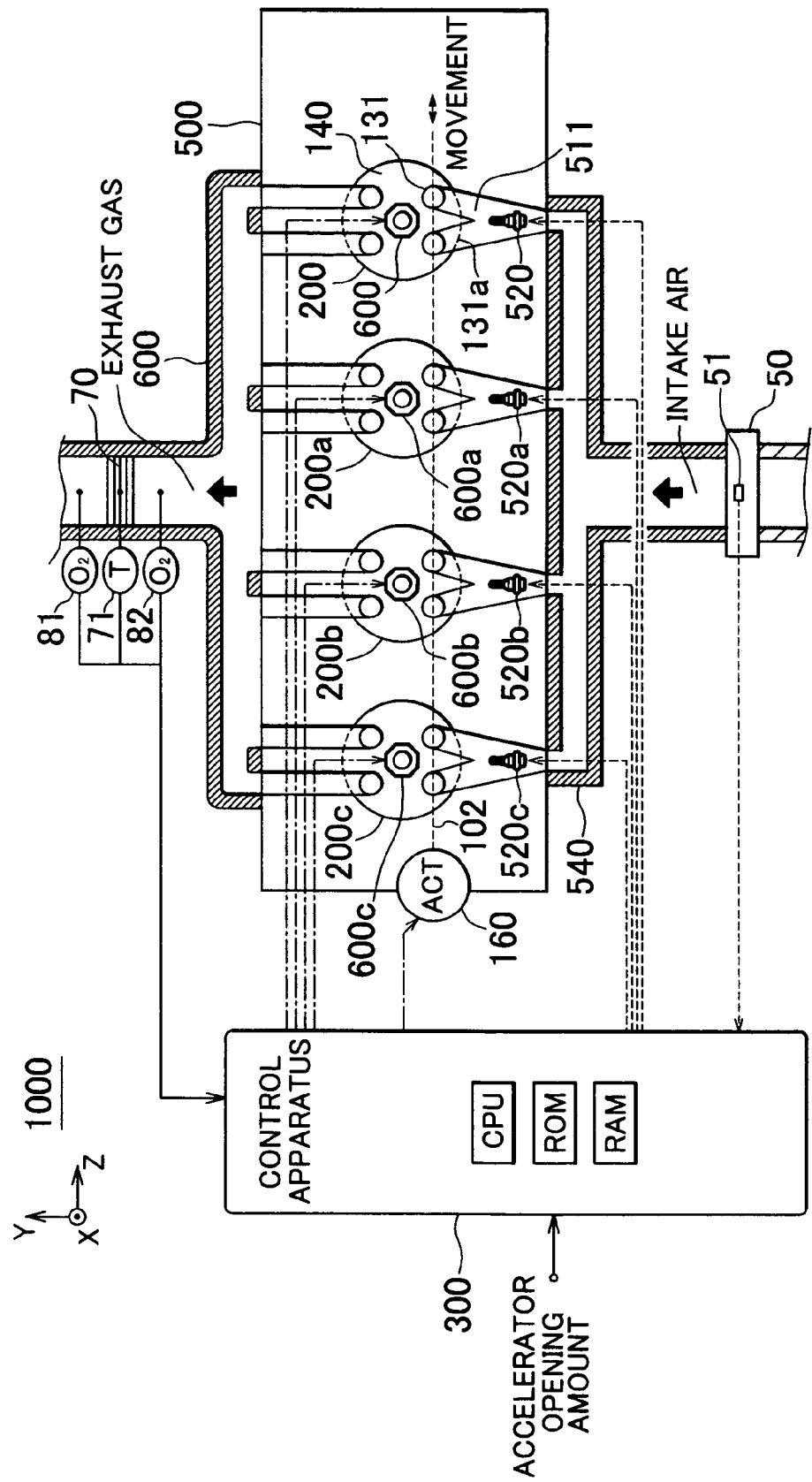
FIG. 1 is an explanatory diagram showing an entire configuration of a gasoline engine 1000 according to an embodiment of the invention.

Hereinafter, embodiments of the invention will be described in the following order.
A. Entire Configuration
B. Configuration of Functional Blocks
C. Process
D. Modified Example 1; A Permissible Range
E. Modified Example 2; A Decision Mode F. Modified Example 3; Switching Among Modes A. Entire Configuration FIG. 1 is an explanatory diagram showing an entire configuration of a gasoline engine 1000 according an embodiment of the invention. FIG. 1 shows a cylinder block 500 of the gasoline engine 1000, in which four cylinders 200, 200a, 200b, 200c are provided. The cylinder 200 includes two intake valves 131, 131a. Similarly, each of the cylinders 200a, 200b, 200c includes two intake valves. The gasoline 1000 includes a variable valve system in which a working angle and a lift amount of each intake valve of each cylinder are varied in association with each other.

An intake manifold 540 supplies air to the cylinders 200, 200a, 200b, 200c. The intake manifold 540 communicates with an intake port 511 of the cylinder 200, and intake ports of the other cylinders 200a, 200b, 200c. The air passing through the intake manifold 540 is taken to each of the cylinders through each of the intake ports. A surge tank 50 is provided upstream of the intake manifold 540. The surge tank 50 is a calm tank which prevents pulsation of intake air. An intake air pressure sensor 51 which measures pressure of intake air flowing into the four cylinders through the intake manifold 540 is provided in the surge tank 50.

Each of injectors 520, 520a, 520b, 520c injects fuel to the intake air passing through each of the intake ports of the four cylinders. An air-fuel mixture passes through the intake port 511 of the cylinder 200, flows into a combustion chamber 140, and then is burned by spark. Similarly, the air-fuel mixture flowing into each of the cylinders 200a, 200b, 200c is burned by spark of spark plug 600a, 600b, 600c. The exhaust gas generated due to combustion is discharged to the outside of the cylinder block 500 by an exhaust manifold 700.

Figure 2:
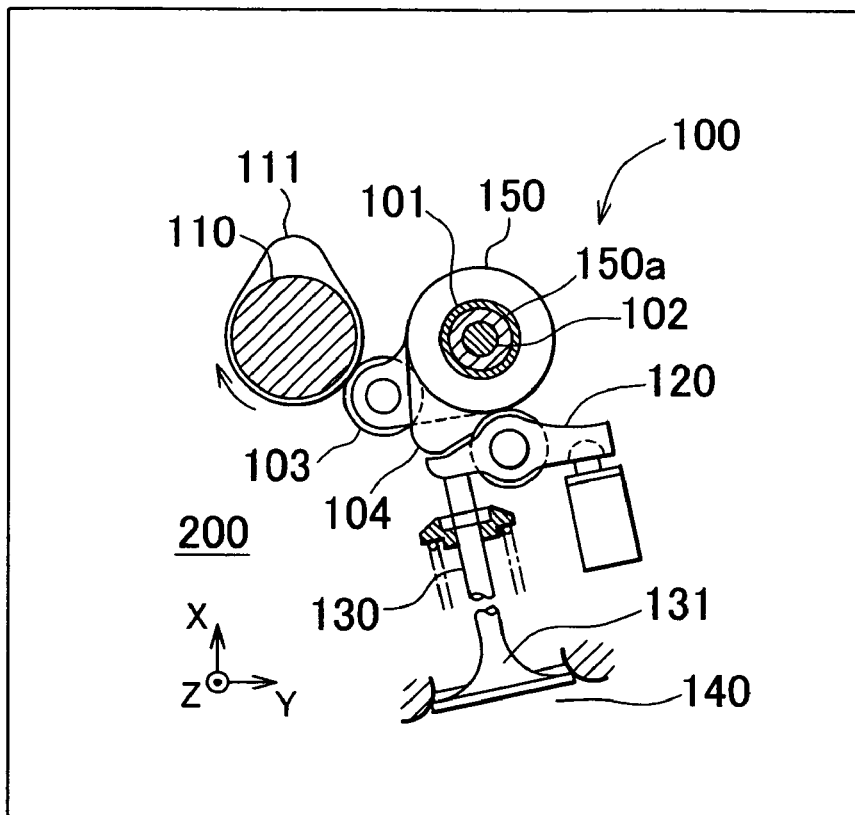
FIG. 2 is an explanatory diagram showing a drive mechanism 100 which drives an intake valve 131.
Figure 2:
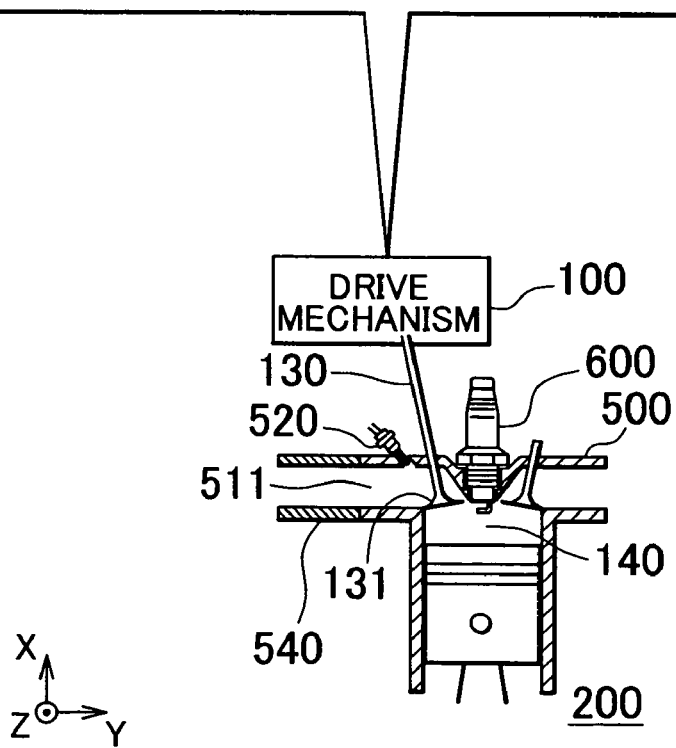

FIG. 2 is an explanatory diagram showing a drive mechanism 100 which drives the intake valve 131. The drive mechanism 100 opens/closes the intake valve 131 using a stem end 130 as shown in a lower part of FIG. 2.

In an upper part of FIG. 2, the drive mechanism 100 is shown in detail. The intake cam shaft 110 and the intake cam 111 are rotated in association with the crank shaft of the gasoline engine 1000. An oscillating cam 150 has an input portion 103 and an output portion 104. The oscillating cam 150 oscillates according to rotation of the intake cam 111. Oscillation of the oscillating cam 150 allows driving force to be transmitted to the intake valve 131 through a locker arm 120 and the stem end 130. This opens the intake valve 131.

A support pipe 101 is a hollow pipe. A control shaft 102 which can move in a z-axis direction (in an axis direction of the support pipe 101) extends in the support pipe 101. As shown in FIG. 1, the control shaft 102 is moved in the z-axis direction by an actuator 160.

A slider gear 150a is provided in an outer periphery of the support pipe 101. The slider gear 150a can move in the z-axis direction and can rotate around the z-axis, with respect to the support pipe 101. The slider gear 150a oscillates around the z-axis together with the oscillating cam 150. The slider gear 150a moves so as to follow movement of the control shaft 102 in the z-axis direction.

The slider gear 150a and the input portion 103 are connected to each other with helical spline grooves thereof being fitted to each other. The slider gear 150a and the output portion 104 are connected to each other with helical spline grooves thereof being fitted to each other. The input portion 103 and the output portion 104 are different from the slider gear 150a in that they cannot move in the z-axis direction. Therefore, when the slider gear 150a moves in the z-axis direction, the input portion 103 and the output portion 104 oscillate around the z-axis. The thread direction of the spline grooves of the input portion 103 is opposite to the thread direction of the spline grooves of the output portion 104. Therefore, the input portion 103 and the output portion 104 oscillate in the opposite directions.

The drive mechanism 100 is configured as described above, the valve opening characteristics of the intake valve 131 are varied when the shaft 102 is moved by the actuator 160.

Each of the cylinders 200a, 200b, 200c has the same drive mechanism as the drive mechanism 100 of the cylinder 200. The control shaft 102 and the support pipe 101 which are moved by the actuator 160 extends through the drive mechanism 100 and the other three drive mechanisms. The four slider gears in each cylinder are fitted to the support pipe 101. The actuator 160 changes the valve opening characteristics of the cylinder 200 and the other cylinders by moving, in the z-axis direction, the control shaft 102 which extends through the drive mechanism 100 and the other three drive mechanisms.

The variable valve system shown in FIG. 1 and FIG. 2 is exemplary. As the variable valve system, a variable valve system including an oscillating cam, a variable valve system including a three-dimensional cam, or other variable valve systems of various types may be employed. For example, it is possible to employ a variable valve system in which the valve opening characteristics of each of the cylinder 200 and the other three cylinders are separately varied.

A purification device 70, a temperature sensor 71, and oxygen sensors 81, 82 will be described in a modified example of the embodiment.

The control apparatus 300 shown in FIG. 1 is a computer which includes a CPU, ROM, RAM, and the like. The control apparatus 300 controls operation of the gasoline engine 1000 by controlling various portions of the gasoline engine 1000. For example, the control apparatus 300 controls a fuel injection amount of each of the injector 520 and the other injectors, ignition timing of each of the spark plug 600 and the other spark plugs, and movement of the control shaft 102 by the actuator 160. In order to perform these controls, the control apparatus 300 obtains information from various sensors provided in the gasoline engine 1000. For example, the control apparatus 300 obtains information on the accelerator opening amount, and information on the intake air pressure detected by the intake air pressure sensor 51.

B. Configuration of Functional Blocks

Figure 3:
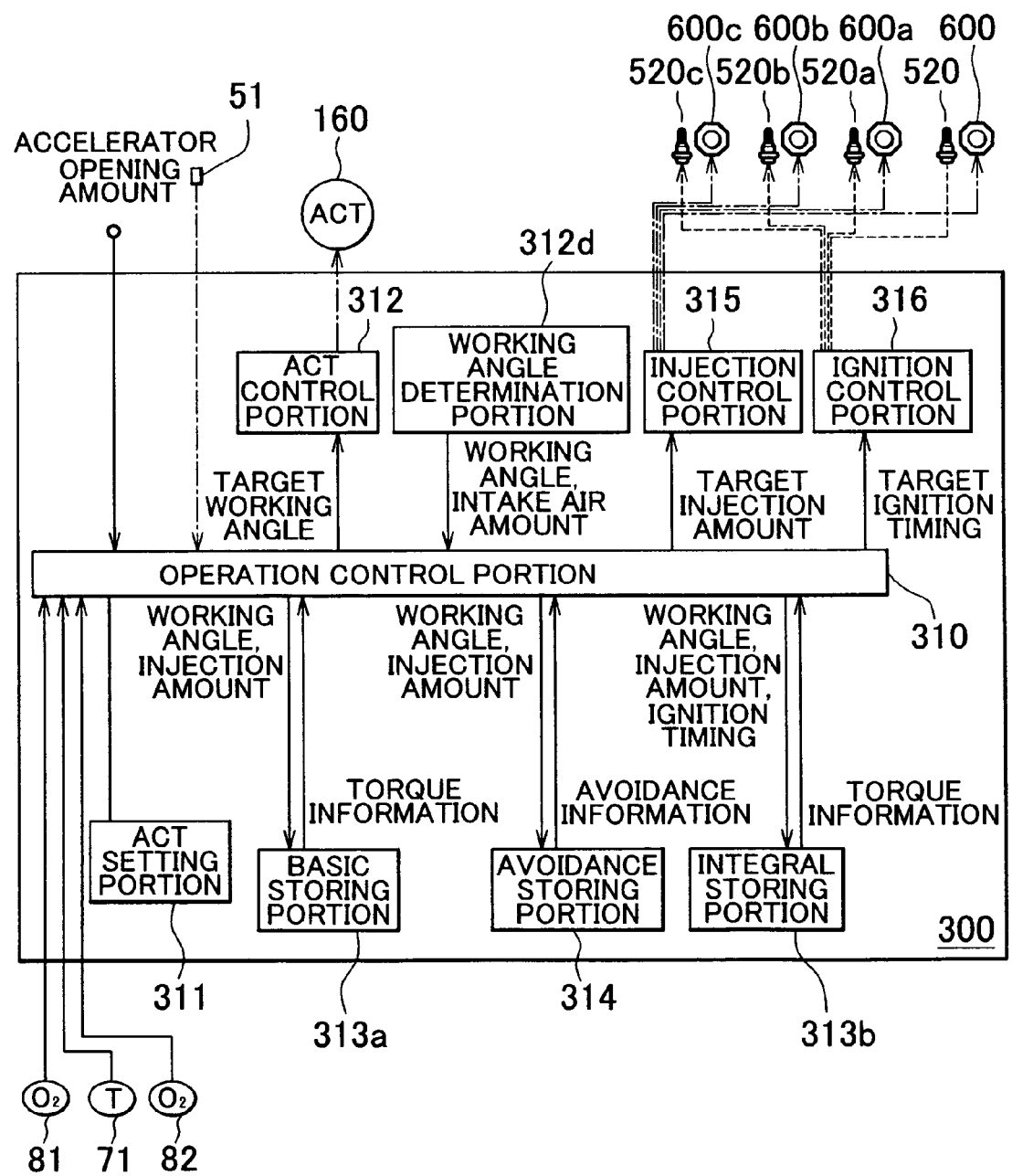
FIG. 3 is an explanatory diagram showing function blocks realized by a control apparatus 300.

FIG. 3 is an explanatory diagram showing function blocks realized by the control apparatus 300. An operation control portion 310 decides a target working angle based on the accelerator opening amount. When deciding the target working angle, the operation control portion 310 refers to a map showing a relation between accelerator opening amounts and the target working angles, which is stored in an ACT setting portion 311.

A working angle determination portion 312d detects the actual intake air amount in each of the four cylinders. The working angle determination portion 312d determines the actual intake air amount using the sensors and the like provided in the gasoline engine 1000, e.g., such as the intake air sensor 51. Also, the working angle determination portion 312d holds the map showing the relation between the intake air amount and the working angle in advance. The working angle determination 312d can determine the actual working angle of each cylinder according to the detected actual intake air amount by referring to the map.

The working angle determination portion 312d may determine the actual intake air amount based on the throttle opening amount, the position of the control shaft 102, the intake air pressure and the air-fuel ratio of each cylinder, and the like. Also, the working angle determination portion 312 may determine the actual intake air amount according to the torque fluctuation or the fluctuation of the rotation of the gasoline engine 1000. The working angle determination portion 312d may use a so-called air flow meter which measures the intake air amount, or a so-called air-fuel ratio sensor. The working angle determination portion 312d may consider the temperature of the intake air or the coolant, or the result of measurement of thermal strain of the control shaft 102, in order to accurately estimate the actual intake air amount.

The operation control portion 310 decides a target fuel injection amount for each cylinder, and target ignition timing for each cylinder. The operation control portion 310 instructs the target injection amount to each injector using an injection control portion 315, and instructs target ignition timing to each spark plug using an ignition control portion 316.

The operation control portion 310 decides the target injection amount and the target ignition timing by referring to a basic storing portion 313a, an avoidance storing portion 314, and an integral storing portion 313b. The basic storing portion 313a and the integral storing portion 313b store torque information concerning the generated torque in each cylinder, and the avoidance storing portion 314 stores, as avoidance information, an air-fuel ratio region which needs to be avoided in order to maintain the purification level of exhaust gas.

Figure 4:
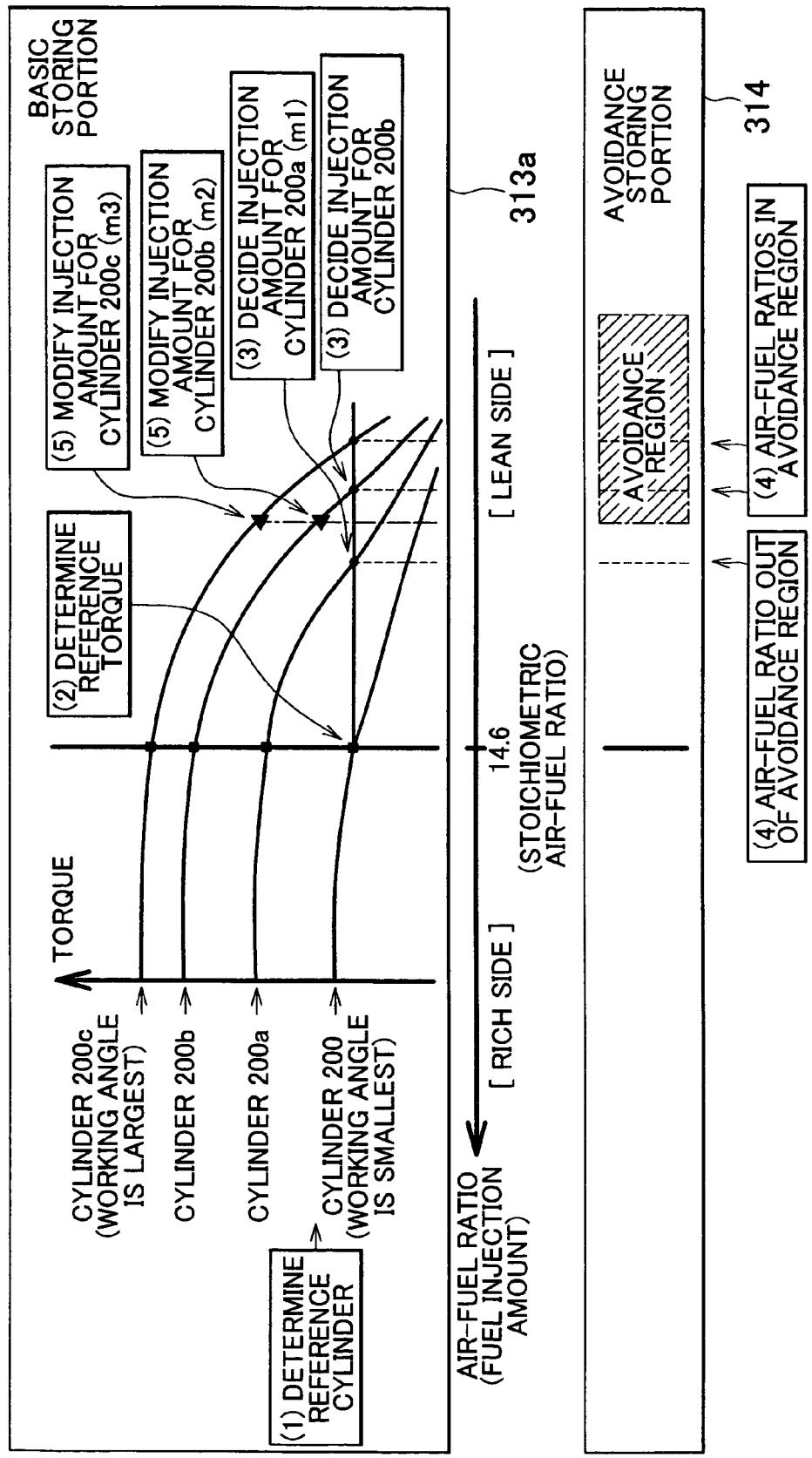
FIG. 4 is an explanatory diagram showing maps of a basic storing portion 313a and an avoidance storing portion 314.

FIG. 4 is an explanatory diagram showing maps of the basic storing portion 313a and the avoidance storing portion 314. The basic storing portion 313a stores the relation between the air-fuel ratio and the generated torque for each of the actual working angles of the cylinders. FIG. 4 shows an example of the relation between the air-fuel ratio and the generated torque for each of the actual working angles of the four cylinders 200, 200a, 200b, 200c. The map stores the torque in the case where the basic ignition timing is employed. In the case where the basic ignition timing is employed, the ignition timing at which the generated torque becomes highest is employed as the basic ignition timing. The basic storing portion 313a may store the generated torque according to the fuel injection amount instead of the air-fuel ratio. The avoidance storing portion 314 may store the avoidance region according to the fuel injection amount, instead of the air-fuel ratio.

In FIG. 4, the working angle is smallest in the cylinder 200, and the working angle increases in order of the cylinder 200, 200a, 200b, 200c. The actual intake air amount is smaller in a cylinder in which the actual working angle is smaller. Accordingly, the generated torque is lower in a cylinder in which the actual working angle is smaller, i.e., actual intake amount is smaller at the same air-fuel ratio (refer to square marks in FIG. 4). In the case where the working angles are equal, as the air-fuel ratio is leaner, the generated torque in each cylinder is lower, and as the air-fuel ratio is richer, the generated torque in each cylinder is higher. In the region which is richer than the stoichiometric air-fuel ratio, however, the generated torque is not changed much even when the air-fuel ratio is changed.

The avoidance storing portion 314 stores the air-fuel ratio region in which the emission amount is out of the permissible range (hereinafter, referred to as "avoidance region") as shown in a lower part of FIG. 4.

Figure 5:
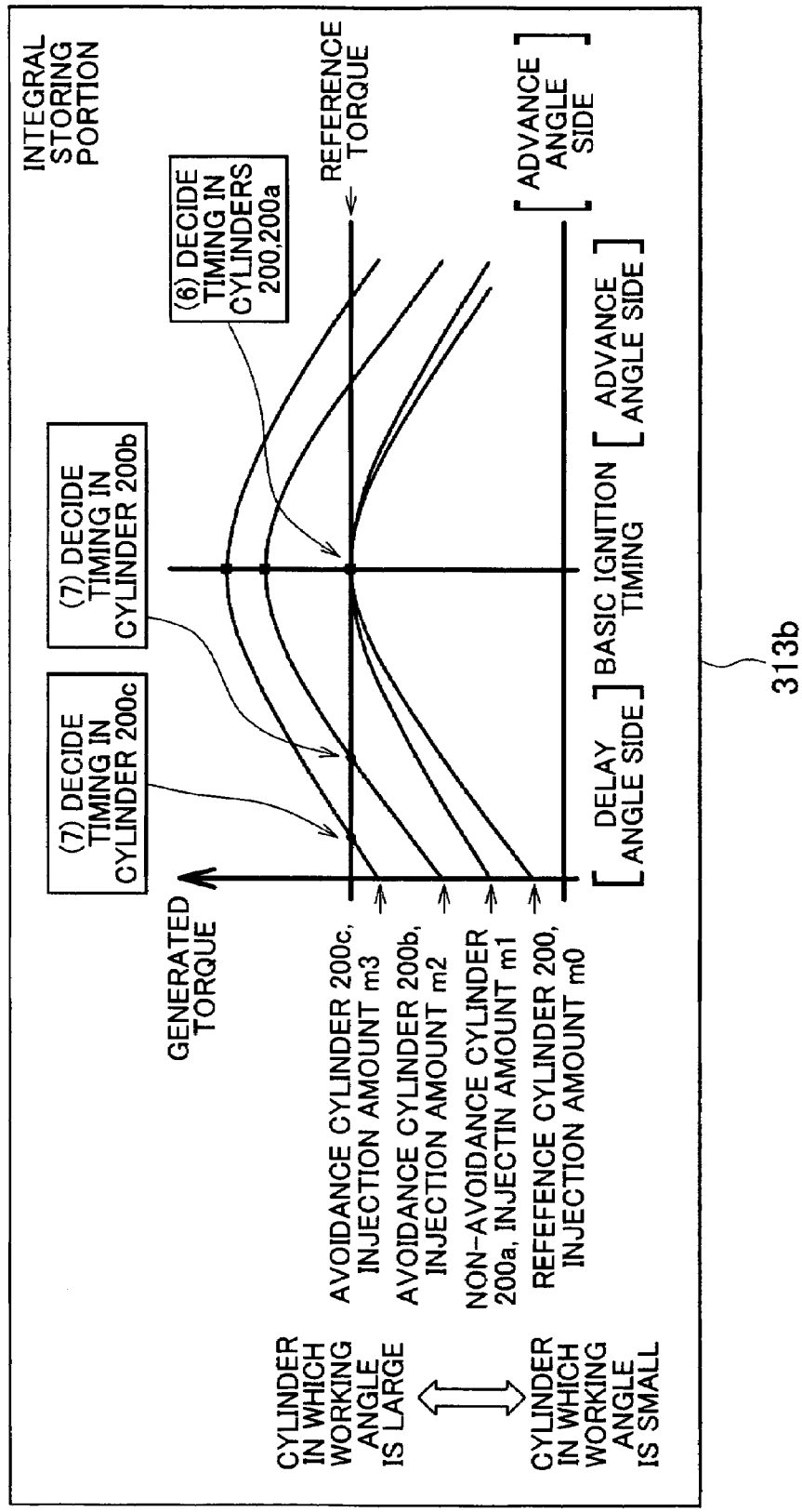
FIG. 5 is an explanatory diagram showing a map of an integral storing portion 313b.

FIG. 5 is an explanatory diagram showing a map of the integral storing portion 313b. The integral storing portion 313b stores the map showing the relation between the ignition timing and the generated torque. The map is prepared for each combination of the fuel injection amount and the working angle. As shown in FIG. 5, the generated torque becomes lower as the ignition timing deviates from the basic ignition timing toward an advance angle side or a delay angle side to a larger extent.

In the embodiment, two maps for storing torque information are prepared, and each of the two maps is stored in the basic storing portion 313a and the integral storing portion 313b. However, the invention is not limited to this mode of storing the torque information. The torque information may be stored using one multifactorial map showing the generated torque corresponding to the actual working angle, the fuel injection amount (or the air-fuel ratio), and the ignition timing in each cylinder. The control apparatus 300 may store an equation by which the generated torque can be derived.

C. Process

Figure 6:
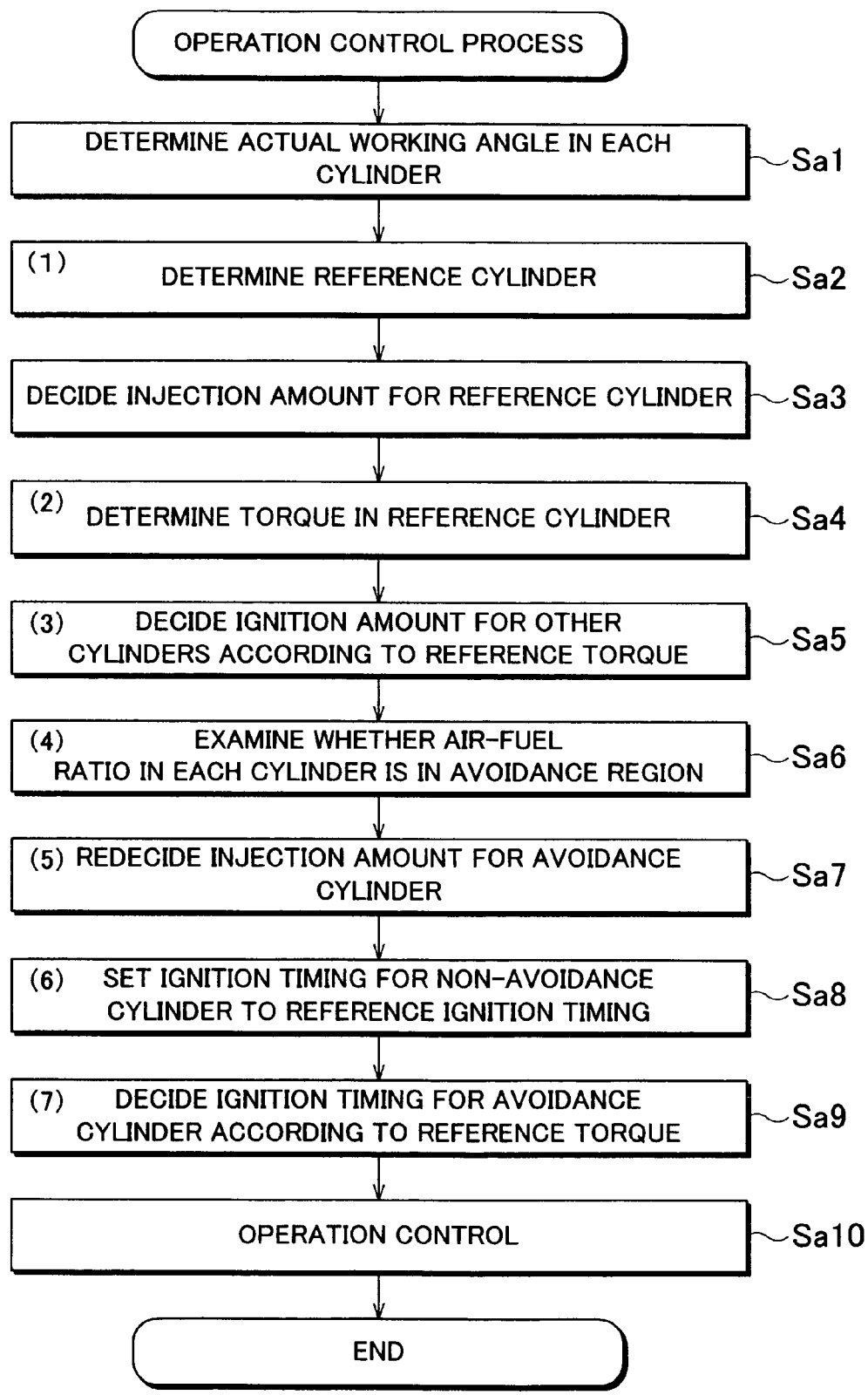
FIG. 6 is a flowchart showing an operating control process.

FIG. 6 is a flowchart showing operation control process. The control apparatus 300 performs the operation control process shown in FIG. 6, thereby deciding the target injection amount and the target ignition timing for each cylinder, and operating the gasoline engine 1000 based on the decided target injection amount and the decided target ignition timing.

In step Sa1, the control apparatus 300 determines the actual intake air amount and the actual working angle in each of the cylinder 200 and the other three cylinders 200a, 200b, 200c, using the intake air pressure sensor 51 and the like. In step Sa2, the control apparatus 300 determines a cylinder in which the actual working angle is smallest as the reference cylinder. In the example shown in FIG. 4, the cylinder 200 is determined as the reference cylinder as shown in (1). In step Sa3, the control apparatus 300 sets the target injection amount in the reference cylinder 200 to the basic injection amount for realizing the stoichiometric air-fuel ratio. In step Sa4, the control apparatus 300 determines the reference torque generated in the reference cylinder 200 by referring to the basic storing portion 313a according to the air-fuel ratio and the working angle in the reference cylinder 200 (refer to (2) in FIG. 4).

In step Sa5, the control apparatus 300 decides the target injection amount for each of the other cylinders 200a, 200b, 200c such that the torque equal to the reference torque is generated (refer to (3) in FIG. 4). In step Sa6, the control apparatus 300 examines whether the air-fuel ratio in each cylinder is in the avoidance region. In the example shown in (4) in FIG. 4, the air-fuel ratio in the cylinder 200a is out of the avoidance region, but the air-fuel ratio in each of the cylinders 200b, 200c is in the avoidance region.

In step Sa7, the control apparatus 300 modifies and redecides the target injection amount for the cylinders 200b, 200c in each of which the air-fuel ratio is in the avoidance region (hereinafter, referred to as "avoidance cylinders"). More specifically, the target injection amount is modified so as to achieve the air-fuel ratio which is out of the avoidance region, and at which the torque closest to the reference torque is generated (refer to (5) in FIG. 4).

In step Sa8, the control apparatus 300 sets the target ignition timing in the cylinders 200, 200a, in each of which the air-fuel ratio is out of the avoidance region (hereinafter, referred to as "non-avoidance cylinder") to the basic ignition timing (refer to (6) in FIG. 5). In the case where the basic ignition timing is employed, as shown in FIG. 5, the generated torque in each of the non-avoidance cylinders 200, 200a becomes equal to the reference torque. In step Sa9 in FIG. 6, the control apparatus 300 sets the ignition timing in each of the avoidance cylinders 200b, 200c such that the torque substantially equal to the reference torque is generated (refer to (7) in FIG. 5).

In step Sa10, the control apparatus 300 performs operation control based on the target injection amount and the target ignition timing which is set for each cylinder.

In the gasoline engine 1000 thus described, the air-fuel ratio and the ignition timing are integrally decided considering the torque generated in each cylinder, and the emission amount, instead of controlling operation of each cylinder such that the air-fuel ratio in each cylinder becomes equal. As a result, even when the actual intake air amount varies with each cylinder, the purification level of exhaust gas can be maintained, and the torque fluctuation can be suppressed.

In the embodiment that has been described, the gasoline engine is employed. However, the technology in the embodiment can be applied to a diesel engine. When controlling operation of a diesel engine, the fuel injection timing may be controlled, instead of the ignition timing. Also, the aforementioned technology may be used for operation for performing so-called lean burn at the air-fuel ratio leaner than the stoichiometric air-fuel ratio. Further, the control apparatus 300 may modify the avoidance region (refer to FIG. 4) according to a deterioration degree of a catalyst in the internal combustion engine.

D. Modified Example 1; a Permissible Range

In the embodiment, the fuel injection amount is decided such that equal torque is generated in all of the four cylinders. However, the invention is not limited to this mode of deciding the fuel injection amount. Hereinafter, description will be made of a case where the fuel injection amount and the like are decided such that the generated torque in each cylinder is in a predetermined permissible range.

Figure 7:
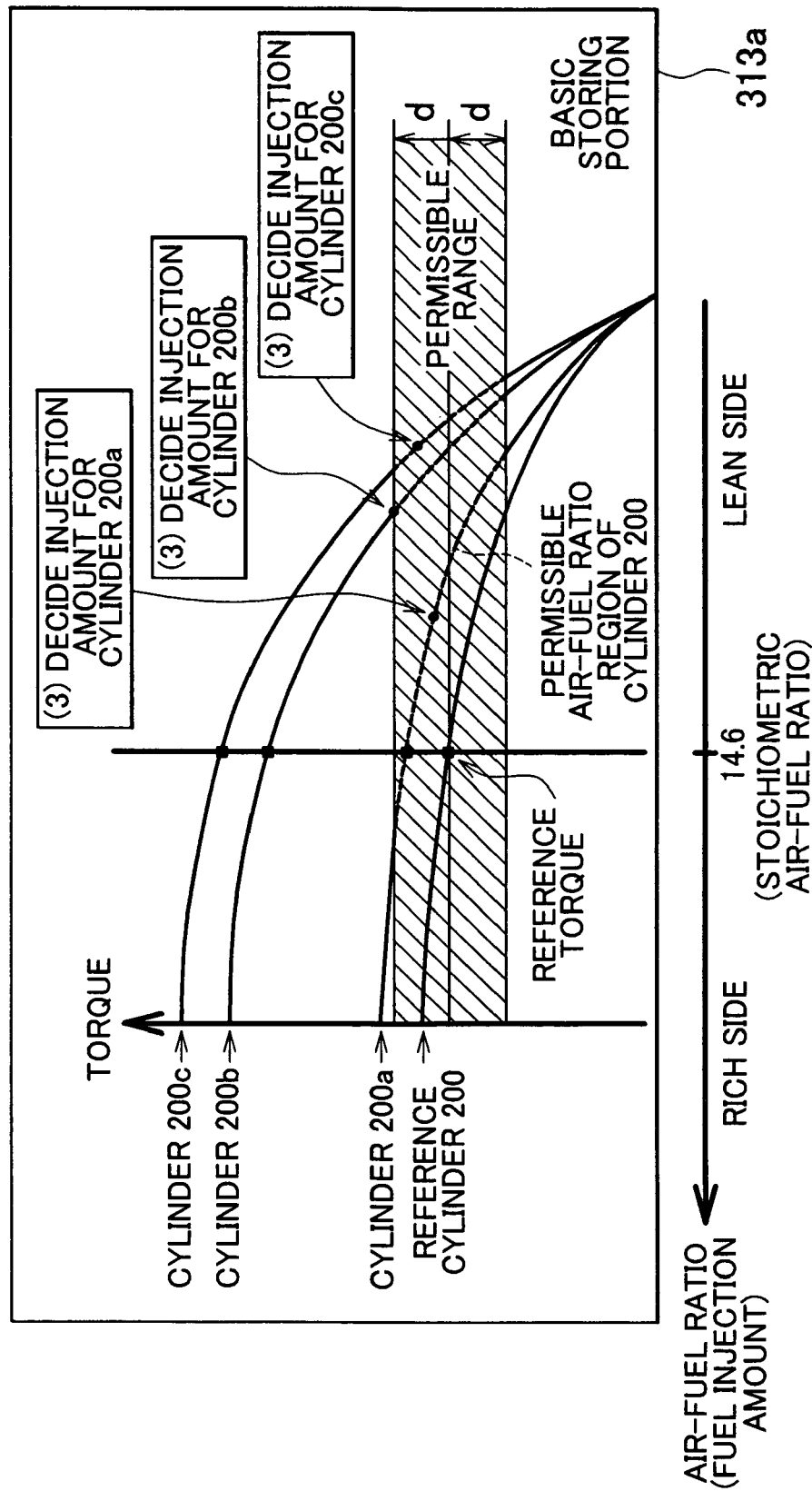
FIG. 7 is an explanatory diagram conceptually showing a process when small fluctuation is permitted.

FIG. 7 is an explanatory diagram conceptually showing a process when small fluctuation is permitted. The map in FIG. 7 corresponds to the map in the basic storing portion 313a shown in FIG. 4. FIG. 7 shows the permissible range of the generated torque. The permissible range shown in FIG. 7 is determined by a predetermined permissible width d of the generated torque. The permissible width d is set in the basic storing portion 313a in advance. The permissible width d is set such that torque fluctuation causes a problem if a difference between the generated torque in each of all the cylinders other than the reference cylinder and the reference torque in the reference cylinder is out of the permissible width d.

In step Sa5 in FIG. 6, the control apparatus 300 decides the target injection amount in the cylinders 200a, 200b, 200c other than the reference cylinder 200 such that the generated torque in each of the cylinders 200a, 200b, 200c is in the permissible range. More particularly, the control apparatus 300 decides the target injection amount so as to achieve the air-fuel ratio in the air-fuel ratio region shown by a dashed line (permissible region) in FIG. 7.

Thus, the combustion condition which allows the purification level of exhaust gas to be highest can be employed in the range in which torque fluctuation does not occur.

When a difference in the intake air amount between the cylinder in which the actual intake air amount is smallest, and the cylinder in which the actual intake air amount is second smallest is equal to or smaller than a predetermined value, the cylinder in which the actual intake air amount is second smallest may be determined as the reference cylinder. Also, as the reference torque, it is possible to employ an intermediate value (for example, an average value) between the generated torque in the cylinder in which the actual intake air amount is smallest and the generated torque in the cylinder in which the actual intake air amount is second smallest.

E. Modified Example 2; a Decision Mode

In the embodiment, the ignition timing is adjusted only when the differences in the torque cannot be sufficiently suppressed only by adjusting the target injection amount. More particularly, priority is given to adjustment of the target injection amount. However, priority may be given to adjustment of the target ignition timing over adjustment of the target injection amount.

Figure 8:
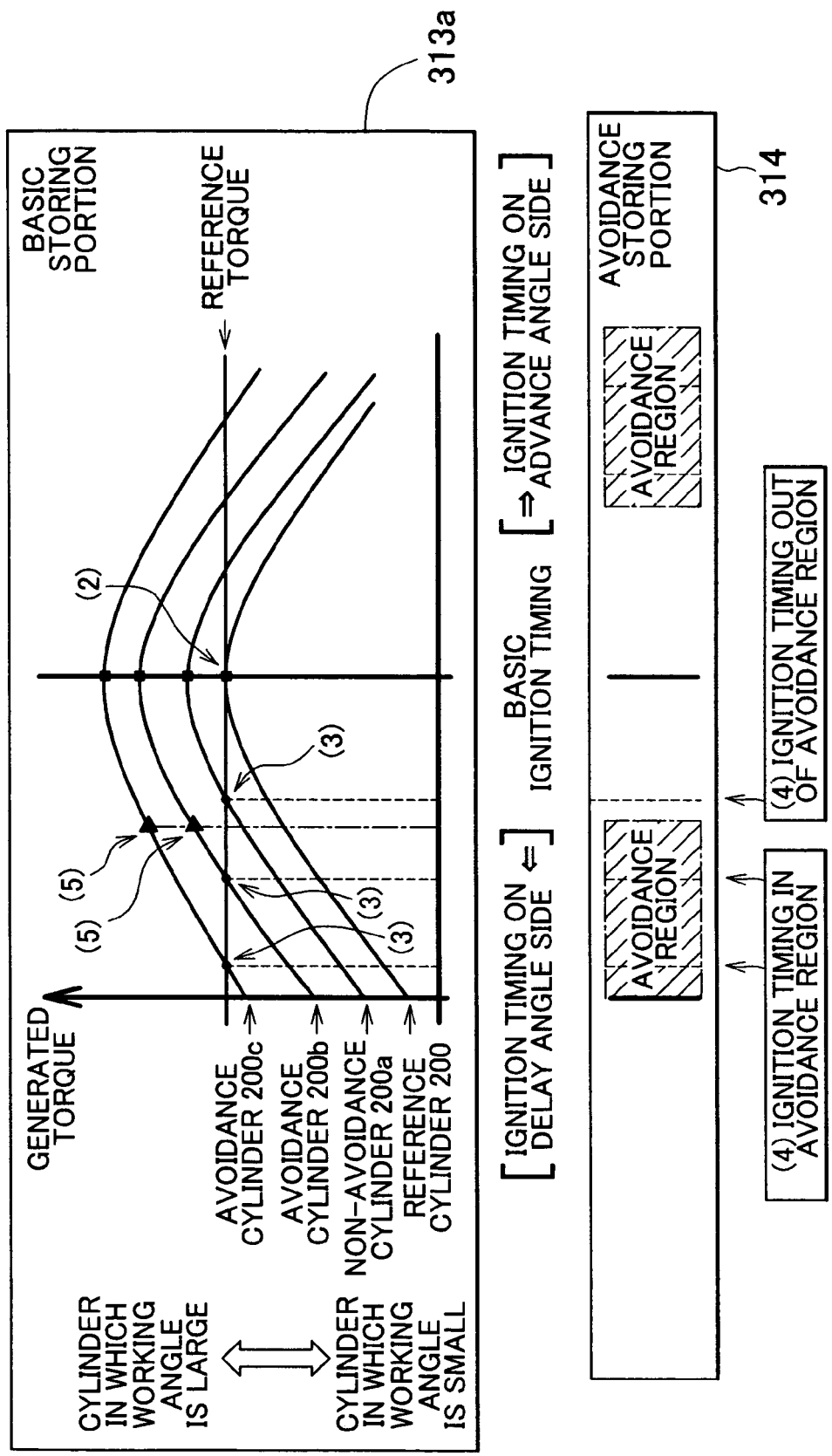
FIG. 8 is an explanatory diagram showing a process when priority is given to adjustment of target ignition timing.

FIG. 8 is an explanatory diagram showing the process when priority is given to adjustment of target ignition timing. The explanatory diagram in FIG. 8 corresponds to the explanatory diagram in FIG. 4 in the embodiment. In FIG. 8, the basic storing portion 313a maintains the map for storing the generated torque at each ignition timing when the basic injection amount is employed. The avoidance storing portion 314 stores, as the avoidance region, the ignition timing region in which a problem concerning the temperature of exhaust gas occurs.

The operation control process in FIG. 8 is the same as the operation control process in the embodiment shown in FIG. 6 in principle. In steps Sa1 to Sa4 in FIG. 6, as in the embodiment, the reference torque is set to the generated torque in the reference cylinder 200 in which the actual intake air amount is smallest when the basic ignition timing and basic injection amount are employed. In the modified example, the target ignition timing for each of the cylinders other than the reference cylinder is decided according to the reference torque in step Sa5. Thus, the modified example is different from the embodiment in which the target injection amount for each of the cylinders other than the reference cylinder is decided (refer to (3) in FIG. 8). In step Sa6, it is examined whether each ignition timing decided in step Sa5 is in the avoidance region (refer to (4) in FIG. 8). In step Sa7, the target ignition timing for each of the avoidance cylinders 200b, 200c is modified and decided (refer to (5) in FIG. 8). Subsequently, the control apparatus 300 sets the target injection amount for each of the non-avoidance cylinders 200, 200a to the basic injection amount (step Sa8). Also, the target injection amount for each of the avoidance cylinders 200b, 200c is decided such that the torque substantially equal to the reference torque is generated in each cylinder, as in the embodiment in FIG. 5 (step Sa9).

The invention is not limited to a case where one of the target injection amount and the target ignition timing is adjusted with higher priority when deciding the target injection amount and the like. Both of the target injection amount and the target ignition timing may be integrally adjusted. For example, an amount by which the fuel injection amount is deviated from the basic injection amount may be expressed by aX, and an amount by which the ignition timing is deviated from the basic ignition timing may be expressed by bX (each of a, b is a predetermined constant; and X is a variable). In this case, the target injection amount and the target ignition timing can be adjusted by changing the variable X.

The operation control portion 310 may adjust only one of the target injection amount and the target ignition timing, and the other may be constantly fixed to the basic injection amount or the basic ignition timing. For example, the ignition timing may be constantly fixed to the basic ignition timing by performing the process in the embodiment without setting the avoidance region.

F. Modified Example 3; Switching Among Modes

As described above, various modes of deciding the target injection amount and the target ignition timing may be employed. The control apparatus 300 may select and perform one of the plural modes.

As shown in FIG. 1, the purification device 70 having the catalyst is provided in the gasoline 1000. The purification device 70 purifies the exhaust gas, and reduces the emission amount. The purification device 70 according to the embodiment achieves a high purification rate in a relatively large air-fuel ratio region, while storing and emitting oxygen in the exhaust gas. The performance of the purification device 70 varies according to the temperature of the catalyst and the amount of oxygen stored in the catalyst.

The temperature sensor 71 that detects the temperature of the catalyst is provided in the purification device 76. Also, each of the two oxygen sensors 81, 82 (shown in FIG. 1), which are provided upstream and downstream of the purification device 70, detects the amount of oxygen contained in the exhaust gas flowing into or flowing out of the purification device 70. The results of measurement by the two oxygen sensors 81, 82 become different from each other according to the storage state of oxygen in the catalyst.

The control apparatus 300 can estimate the performance of the purification device 70 according to the temperature of the catalyst, and the difference in the response between the two oxygen sensors 81, 82. Since the performance of the catalyst may vary according to the storage and adsorption state of material other than oxygen in the catalyst, the control apparatus 300 may detect or estimate the storage and adsorption state of material other than oxygen in the catalyst. Also, the control apparatus 300 may be able to detect a time-dependent decrease in the performance of the purification device 70.

FIG. 9 is a flowchart showing the operation control process for switching modes of deciding the target injection amount and the target ignition timing. In step Sb1, the control apparatus 300 determines whether the catalyst has deteriorated. The control apparatus 300 selectively performs one of step Sb31 and step Sb32 in the operation control process, according to whether the catalyst has deteriorated (step Sb2).

When the catalyst has not deteriorated, the control apparatus 300 performs the operation control process in the mode in which only the target injection amount is adjusted (step Sb31). In this case, the ignition timing is fixed to the basic ignition timing. Meanwhile, when the catalyst has deteriorated, the control apparatus 300 performs the operation control process for adjusting not only the fuel injection amount but also the ignition timing in step Sb32. In step Sb32, the fuel injection amount close to the basic injection amount is employed as compared with the case where step Sb31 is performed while the intake air amount in each cylinder is the same as in step Sb32.

By using the aforementioned process, switching can be performed among the different combustion conditions according to the performance of the catalyst.

The basis on which the control apparatus 300 selects the operation control process is not limited to a basis regarding the performance of the catalyst, and various bases may be employed. For example, the control apparatus 300 may select the operation control process on the basis of the intake air amount, the generated torque, the working angle, inequality of these factors, the emission amount, the temperature of exhaust gas, the load of the internal combustion engine, or the like. Also, the control apparatus 300 may select the operation control process on the basis of various types of information concerning difficulty in avoiding torque fluctuation, difficulty in maintaining the purification level of exhaust gas, or the like.

The control apparatus 300 may adjust only the fuel injection amount when a problem concerning an increase in the emission amount is not likely to occur, for example, when the catalyst has not deteriorated. Similarly, the control apparatus 300 may adjust only the ignition timing when a problem concerning an increase in the temperature of exhaust gas is not likely to occur.

The control apparatus 300 may adjust one of the fuel injection amount and the ignition timing when torque fluctuation is not likely to occur, for example, when the difference in the working angle, the intake air amount, or the like is small, or when the working angle is large, and may adjust both of the fuel injection amount and the ignition timing when torque fluctuation is likely to occur. When torque fluctuation is not likely to occur, the control apparatus 300 may decide the fuel injection amount or the ignition timing considering only the purification level of exhaust gas, and without considering torque fluctuation. For example, when torque fluctuation is not likely to occur, the fuel injection amount may be controlled such that the air-fuel ratios in all of the cylinders become equal, in order to maintain the purification level of exhaust gas.

The control apparatus 300 may adjust only the ignition timing when the internal combustion engine is idling, and may adjust both of the fuel injection amount and the ignition timing when the load of the internal combustion engine is low.

The internal combustion engine and the control apparatus for an internal combustion engine according to the embodiments of the invention have been described. However, the embodiments of the invention that have been described are exemplary embodiments for promoting understanding of the invention, and the invention is not limited to the embodiments. Various changes and modifications can be made without departing from the true spirit of the invention.

In the invention, the aforementioned various embodiment and the modified examples may be appropriately combined, or may be employed with part thereof being omitted.

What is claimed is:

1. A control apparatus which controls operation of an internal combustion engine including plural cylinders, comprising:

an obtaining portion that obtains a parameter concerning a valve opening characteristic of an intake valve of each of the plural cylinders;

a combustion condition deciding portion that decides a combustion condition for each of the plural cylinders determined by at least one of deciding a priority of adjusting the combustion condition between a fuel injection amount and ignition timing and deciding a variable factor of adjusting the combustion condition integrally among the fuel injection amount and ignition timing, according to the parameter; and a control portion that controls operation of each of the plural cylinders under the decided combustion condition, wherein torque generated in each of the plural cylinders is decided according to the parameter and the combustion condition, and the combustion condition deciding portion decides the combustion condition such that a difference between the torque generated in each of the plural cylinders and reference torque is in a predetermined permissible range; and an operating state obtaining portion that obtains predetermined information concerning an operating state of the internal combustion engine, and the combustion condition deciding portion switches among plural modes of deciding the combustion condition that are prepared in advance, according to the obtained predetermined information, wherein the internal combustion engine includes a catalyst that purifies exhaust gas, the operating state obtaining portion obtains, as the predetermined information, information on whether the catalyst has deteriorated, and the combustion condition deciding portion adjusts both of the fuel injection amount and the ignition timing when the operating state obtaining portion obtains information that the catalyst has deteriorated, and the combustion condition deciding portion adjusts only the fuel injection amount among the fuel injection amount and the ignition timing when the operating state obtaining portion obtains information that the catalyst has not deteriorated.

2. The control apparatus according to claim 1, wherein the parameter shows an intake air amount in each of the plural cylinders, and the combustion condition deciding portion decides the fuel injection amount for each of the plural cylinders according to the parameter such that air-fuel ratios in the plural cylinders are in a predetermined permissible region.

3. An internal combustion engine which includes plural cylinders, comprising:
a control apparatus, which controls operation of the internal combustion engine comprising:
an obtaining portion that obtains a parameter concerning a valve opening characteristic of an intake valve of each of the plural cylinders;
a combustion condition deciding portion that decides a combustion condition for each of the plural cylinders determined by at least one of deciding a priority of adjusting the combustion condition between a fuel injection amount and ignition timing and deciding a variable factor of adjusting the combustion condition integrally among the fuel injection amount and ignition timing, according to the parameter; and
a control portion that controls operation of each of the plural cylinders under the decided combustion condition, wherein torque generated in each of the plural cylinders is decided according to the parameter and the combustion condition, and the combustion condition deciding portion decides the combustion condition such that a difference between the torque generated in each of the plural cylinders and reference torque is in a predetermined permissible range;
an operating state obtaining portion that obtains predetermined information concerning an operating state of the internal combustion engine, and the combustion condition deciding portion switches among plural modes of deciding the combustion condition that are prepared in advance, according to the obtained predetermined information, wherein the internal combustion engine includes a catalyst that purifies exhaust gas;
the operating state obtaining portion obtains, as the predetermined information, information on whether the catalyst has deteriorated, and the combustion condition deciding portion adjusts both of the fuel injection amount and the ignition timing when the operating state obtaining portion obtains information that the catalyst has deteriorated;
the combustion condition deciding portion adjusts only the fuel injection amount among the fuel injection amount of the ignition timing when the operating state obtaining portion obtains information that the catalyst has not deteriorated; and
a variable valve system in which the valve opening characteristic is varied.

4. The internal combustion engine according to claim 3, wherein the operating state obtaining portion detects at least one of a working angle of the intake valve, a lift amount of the intake valve, intake air pressure in each of the plural cylinders, an intake air amount in each of the plural cylinders, an air-fuel ratio in each of the plural cylinders, torque fluctuation in the internal combustion engine, and a temperature at a predetermined portion of the internal combustion engine, in order to obtain the parameter.

5. The internal combustion engine according to claim 4, wherein the parameter shows the intake air amount in each of the plural cylinders, and the combustion condition deciding portion sets the fuel injection amount such that the air-fuel ratio is higher in a cylinder in which the intake air amount is larger.

6. The internal combustion engine according to claim 4, wherein the parameter shows the intake air amount in each of the plural cylinders; the combustion condition deciding portion includes a reference cylinder setting portion that sets, as a reference cylinder, one of at least one cylinder among the plural cylinders other than a cylinder in which the intake air amount is largest; the combustion condition deciding portion sets, as the reference torque, torque generated in the reference cylinder; and the combustion condition deciding portion decides the combustion condition for at least one cylinder other than the reference cylinder according to the parameter concerning the reference cylinder.

7. The internal combustion engine according to claim 6, wherein, in a case where there is at least one first cylinder in which the air-fuel ratio is out of a predetermined permissible region among the at least one cylinder other than the reference cylinder when the combustion condition deciding portion adjusts the combustion condition for the at least one cylinder other than the reference cylinder such that the difference between the torque generated in each of the plural cylinders and the reference torque is in a predetermined permissible range, the combustion condition deciding portion adjusts the fuel injection amount in the at least one first cylinder such that the air-fuel ratio in the at least one first cylinder is placed in the predetermined permissible region again.

8. The internal combustion engine according to claim 7, wherein, in a case where a difference between torque generated in at least one second cylinder among the at least one first cylinder and the reference torque is out of the predetermined permissible range after the combustion condition deciding portion adjusts the fuel injection amount in the at least one first cylinder, the combustion condition deciding portion adjust the ignition timing or a fuel injection timing in the at least one second cylinder such that the difference between the torque in the at least one second cylinder and the reference torque is placed in the predetermined permissible range.

9. The internal combustion engine according to claim 3, wherein the combustion condition deciding portion decides the combustion condition for each of the plural cylinders such that the torque generated in each of the plural cylinders becomes equal to the reference torque.

10. The internal combustion engine according to claim 3, wherein the combustion condition deciding portion decides the combustion condition for each of the plural cylinders such that the difference between the torque generated in each of the plural cylinders and the reference torque is in a predetermined value.

11. A control method of controlling operation of an internal combustion engine which includes plural cylinders, comprising:
obtaining a parameter concerning a valve opening characteristic of an intake valve of each of the plural cylinders;
deciding a combustion condition for each of the plural cylinders determined by at least one of deciding a priority of adjusting the combustion condition between a fuel injection amount and ignition timing and deciding a variable factor of adjusting the combustion condition integrally among the fuel injection amount and ignition timing, according to the parameter;

controlling operation of each of the plural cylinders under the decided combustion condition, wherein torque generated in each of the plural cylinders is decided according to the parameter and the combustion condition, and the combustion condition for each of the plural cylinders is decided such that a difference between the torque generated in each of the plural cylinders and reference torque is in a predetermined permissible range; and obtaining predetermined information concerning an operating state of the internal combustion engine, and switching among plural modes of deciding the combustion condition that are prepared in advance, according to the obtained predetermined information, wherein the internal combustion engine includes a catalyst that purifies exhaust gas, the predetermined information is information on whether the catalyst has deteriorated, and both of the fuel injection amount and the ignition timing are adjusted when the obtained predetermined information indicates that the catalyst has deteriorated, and only the fuel injection amount among the fuel injection amount and the ignition timing is adjusted when the obtained predetermined information indicates that the catalyst has not deteriorated.

12. A control apparatus which controls operation of an internal combustion engine including plural cylinders, comprising:

an obtaining portion that obtains a parameter concerning a valve opening characteristic of an intake valve of each of the plural cylinders;

a combustion condition deciding portion that decides a combustion condition for each of the plural cylinders determined by at least one of deciding a priority of adjusting the combustion condition between a fuel injection amount and ignition timing and deciding a variable factor of adjusting the combustion condition integrally among the fuel injection amount and ignition timing, according to the parameter;

a control portion that controls operation of each of the plural cylinders under the decided combustion condition, wherein torque generated in each of the plural cylinders is decided according to the parameter and the combustion condition, and the combustion condition deciding portion decides the combustion condition such that a deviation of the torque generated in each of the plural cylinders is in a predetermined permissible range; and an operating state obtaining portion that obtains predetermined information concerning an operating state of the internal combustion engine, and the combustion condition deciding portion switches among plural modes of deciding the combustion condition that are prepared in advance, according to the obtained predetermined information, wherein the internal combustion engine includes a catalyst that purifies exhaust gas, the operating state obtaining portion obtains, as the predetermined information, information on whether the catalyst has deteriorated, and the combustion condition deciding portion adjusts both of the fuel injection amount and the ignition timing when the operating state obtaining portion obtains information that the catalyst has deteriorated, and the combustion condition deciding portion adjusts only the fuel injection amount among the fuel injection amount and the ignition timing when the operating state obtaining portion obtains information that the catalyst has not deteriorated.

* * * * *